N. H. HOLLAND.
PHONOGRAPH RECORDER.
APPLICATION FILED DEC. 19, 1910.
1,131,782.   Patented Mar. 16, 1915.
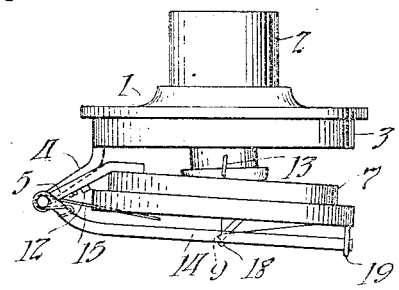
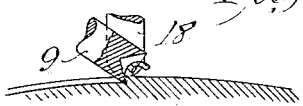
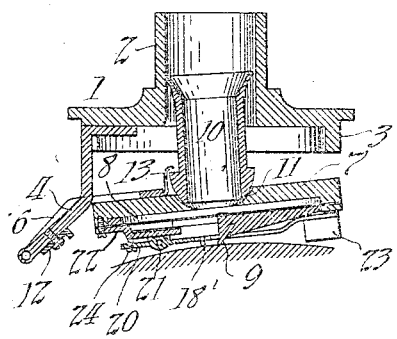
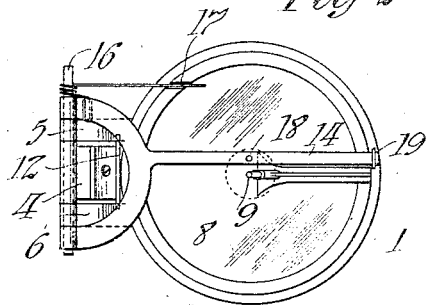
Witnesses:
Robert M. Dutphew.
Dyer Smith
Inventor:
Newman H. Holland,
by Frank L. Dyer
His Atty.

UNITED STATES PATENT OFFICE.

NEWMAN H. HOLLAND, OF WEST ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH-RECORDER.

1,131,782.  Specification of Letters Patent.  Patented Mar. 16, 1915.

Application filed December 19, 1910. Serial No. 598,069.

*To all whom it may concern:*

Be it known that I, NEWMAN H. HOLLAND, a subject of the King of Great Britain, residing at Llewellyn Park, West Orange, in the county of Essex and State of New Jersey, have invented certain new and useful Improvements in Phonograph-Recorders, of which the following is a description.

My invention relates to improvements in phonograph recorders and more particularly to a device in which the compensating weight supporting the diaphragm is made of considerable mass, or to have considerable inertia, so that imperfections in the record due to vibrations of the diaphragm support are reduced to such a degree as to be unobjectionable, and in which a tracker or "ball advance," adapted to bear on the surface to be recorded upon, is employed, means being provided for automatically adjusting the relative positions of the tracker and the recording stylus when the latter engages a moving record surface, whereby the depth of the initial cut of the stylus is controlled. The initial cut is that cut which is taken by the stylus before the sound vibrations to be recorded are caused to impinge upon the diaphragm. This cut is necessary to permit the proper recording of sound rarefactions, which cause an upward movement of the stylus, and should be of a fixed and predetermined depth for the most efficient operation of the recorder.

Because of variations in the set of the diaphragm under different weather conditions and also because of slight changes in the angular relation of the recorder and the surface upon which the record is to be made, the depth of the initial cut taken by the stylus will not be uniform unless some means for adjusting the relative positions of the stylus and the tracker with relation to the surface of the record blank is provided. In devices heretofore used, this adjustment has been provided for by mounting the tracker in a support adjustable by means of a set screw. This adjustment being very small in amount, has been performed by the use of micrometers or other such instruments of precision with the result that the recorders thus constructed have not been adapted for use by the general public. For the recorders of business phonographs, and other phonographs for general use, it has therefore been found impracticable to use a tracker; and the size of the compensating weight has, therefore, been so reduced in these instruments that an objectionable blasting and other undesirable effects due to the springing of said weight from the record surface have been unavoidable, these effects being, in such recorders, particularly marked when the stylus first starts cutting and when the machine is stopped.

It is the object of my invention to improve the construction of the recorders of business phonographs and other phonographs specially adapted for general use; and I accomplish this result by providing the same with a tracker which, when placed on the surface on which the record is to be made, automatically regulates the depth of the initial cut of the stylus thereby making it possible to use a compensating weight of considerable size on such phonographs.

In order that the invention may be better understood, attention is directed to the accompanying drawings forming a part of this specification, and in which—

Figure 1 is a side elevation of a recorder embodying one form of my invention; Fig. 2 is a bottom plan view thereof; Fig. 3 is a detail view taken from the side of the recorder opposite to that shown in Fig. 1 and showing the stylus cutting a record blank; and Fig. 4 is a central, vertical, sectional view of a recorder showing the preferred form of my invention.

In all of the views like parts are designated by the same reference numerals.

The body 1 is of the usual form, being provided with the usual neck or bore 2 and the depending annulus or flange 3. Pivoted to the arm 4 depending from the body 1 are two lugs 5 and 6 carrying a compensating weight 7 constituting a casing for the diaphragm 8 carrying the stylus 9. A weighted tube 10 is preferably employed, and rests at its lower end on the casing 7 to form a ball and socket joint 11 and at the upper end engages the bore 2; so that the tube is capable of vertical movement with respect to the body 1 and together with the member 7 exerts a downward pressure on the stylus. The casing 7 and tube 10 are preferably made of considerable weight so as to eliminate objectionable vibration thereof when the stylus is encountering the resistance of the material being cut. A stop 12 secured to the arm 4 presents excessive downward movement of the compensating weight; and a lip 13 secured to the member 7 prevents accidental displacement of the tube 10.

Referring to Figs. 1 and 2, the form of my invention disclosed therein comprises a pivoted arm or lever 14 having secured thereto a spring 15 preferably mounted on the member 16 which latter constitutes a pivot for the lugs 5 and 6 and the arm 14. This spring also engages within a groove 17 on the bottom of the member 7; so that when the tracker 18 which is mounted in the arm 14, engages the uncut surface of the record blank adjacent the stylus 9 as shown in Fig. 3, the said spring will press upwardly upon and thus partly counterbalance the compensating weight and together with the tracker 18 and the arm 14 will regulate the depth of the initial cut taken by the stylus. The tracker or ball advance 18 is preferably a rounded ball of sapphire or other suitable material.

In Fig. 3 are shown the relative positions of the tracker and stylus when the initial cut is being taken. A loop 19 secured to the member 7 is located adjacent the outer extremity of the arm 14 and limits the downward movement thereof.

In the preferred form of my invention, which is shown in Fig. 4, the tracker 18' is carried by a lever 20 pivoted intermediate its ends as at 21 to a lip 22 or other similar support secured to the casing 7. The arm of this lever which carries the tracker 18' is weighted as at 23 at a position more remote from the pivot 21 than the tracker 18' so that the lever 20 tends to turn about the tracker 18' as a fulcrum when the latter is placed on the record blank and thus to exert an upward pressure on the compensating weight at the pivot 21. The diaphragm and the stylus carried thereby are thus held in proper relation with reference to the said blank for an initial cut. A screw 24 mounted in the lever 20 engages the lip 22 or any other suitable part to regulate the position of the tracker with relation to the stylus when the latter is not in engagement with the record surface.

It is evident that by merely placing my improved recorder in contact with the surface upon which the record is to be made, the stylus will always automatically sink to a proper and uniform depth and that my recorder is therefore of great utility for business phonographs and other phonographs intended for general use.

While I have shown several means for carrying my invention into effect, I do not wish to be understood as confining myself to these means; as my invention is limited only as defined by the terms of the appended claims.

Having now described my invention, what I claim and desire to secure by Letters Patent is:

1. In a device of the class described, the combination with a vibratory stylus, and pressure means tending to force said stylus to cut into a record blank when said stylus engages the blank, of counterbalancing means for said pressure means comprising pivoted tracking means adapted to engage the blank, and means automatically exerting a force tending to move said pressure means away from said tracking means, substantially as described.

2. In a device of the class described, the combination with a vibratory stylus, and pivoted pressure means tending to force said stylus to cut into a record blank when said stylus engages the blank, of counterbalancing means for said pressure means comprising tracking means adapted to engage the blank, and means automatically exerting a force tending to move said pressure means away from said tracking means, substantially as described.

3. In a device of the class described, the combination with a vibratory stylus, and gravity means tending to force said stylus to cut into a record blank when said stylus engages the blank, of counterbalancing means for said gravity means comprising pivoted tracking means adapted to engage the blank, and means automatically exerting a force tending to move said gravity means away from said tracking means, substantially as described.

4. In a device of the class described, the combination with a vibratory member, a stylus connected thereto, and gravity means supporting said vibratory member and tending to force said stylus to cut into a record blank when said stylus engages the blank, of counterbalancing means for said gravity means comprising pivoted tracking means adapted to engage the blank, and means automatically exerting a force tending to move said gravity means away from said tracking means, substantially as described.

5. In a device of the class described, the combination with a vibratory stylus, and pressure means tending to force said stylus to cut into a record blank when said stylus engages the blank, of counterbalancing means for said pressure means comprising tracking means adapted to engage the blank, and gravity means automatically exerting a force tending to move said pressure means away from said tracking means, substantially as described.

6. In a device of the class described, the combination with a vibratory stylus, and pressure means tending to force said stylus to cut into a record blank when said stylus engages the blank, of counterbalancing means for said pressure means comprising a pivoted tracker adapted to engage the blank, and gravity means coacting with said tracker and automatically exerting a force tending to move said pressure means away from said tracker, substantially as described.

7. In a phonograph recorder, the combination with a body, a vibratory member, a recording stylus connected with said vibratory member, and means connected with said body for supporting said vibratory member, of an arm pivoted to said means, and a tracker secured to said arm, said arm being weighted on the same side of its pivot as said tracker and at a position more remote from said pivot than said tracker, substantially as described.

8. In a phonograph, the combination with a body, a compensating weight, a vibratory member carried by said compensating weight and a recording stylus connected to said vibratory member, of a pivoted arm mounted on said compensating weight, and a tracker secured to said arm, said arm being weighted on the same side of its pivot as said tracker and at a position more remote from said pivot than said tracker, substantially as described.

9. In a phonograph, the combination with a body, a compensating weight, a vibratory member carried by said compensating weight and a recording stylus connected to said vibratory member, of a lever having a weight and a tracker secured thereto on one side and a limiting stop adjustably mounted therein on the other side of its pivot, substantially as described.

10. In a phonograph recorder, the combination with a body, a compensating weight, a diaphragm carried by said compensating weight, and a recording stylus connected with said diaphragm, of a lever having a weight adjacent one extremity, means for pivotally securing said lever to said compensating weight, a tracker attached to said lever intermediate its weight and pivot and adapted to bear upon the surface to be recorded upon and a set screw mounted in said lever and adapted to bear on said means to act as a limiting stop for said lever, substantially as described.

11. In a phonograph recorder, the combination with a diaphragm, a stylus connected thereto, and gravity means tending to force said stylus to cut into a record blank when said stylus engages the blank, of means arranged to engage the blank and counterbalance the gravity means to automatically cause the stylus to take an initial cut of a fixed amount regardless of variations in the set of the diaphragm, substantially as described.

12. In a phonograph recorder, the combination with a diaphragm, a stylus connected thereto, and gravity means supporting said diaphragm and tending to force said stylus to cut into a record blank when said stylus engages the blank, of means arranged to engage the blank and counterbalance the gravity means to automatically cause the stylus to take an initial cut of a fixed amount regardless of variations in the set of the diaphragm, substantially as described.

13. In a phonograph recorder, the combination with a diaphragm, a stylus connected thereto, and pivoted gravity means tending to force said stylus to cut into a record blank when said stylus engages the blank, of means arranged to engage the blank and counterbalance the gravity means to automatically cause the stylus to take an initial cut of a fixed amount regardless of variations in the set of the diaphragm, substantially as described.

14. In a phonograph recorder, the combination with a diaphragm, a stylus connected thereto, and means tending to force said stylus to cut into a record blank when said stylus engages the blank, of a tracker arranged to engage the surface of the blank and free to automatically move relatively to said stylus when the recorder is placed in engagement with the blank, and means coacting with said tracker to control the depth of the initial cut of said stylus, said last named means being weighted to partly counterbalance said first named means, substantially as described.

15. In a phonograph recorder, the combination with a diaphragm, a stylus connected thereto, and means tending to force said stylus to cut into a record blank when said stylus engages the blank, of a tracker arranged to engage the surface of the blank and free to automatically move relatively to said stylus when the recorder is placed in engagement with the blank, and pivoted means coacting with said tracker to control the depth of the initial cut of said stylus, said last named means being weighted to partly counterbalance said first named means, substantially as described.

This specification signed and witnessed this 17th day of December 1910.

NEWMAN H. HOLLAND.

Witnesses:
 FREDERICK BACHMANN,
 ANNA R. KLEHM.